US011786811B2

(12) United States Patent
Kim et al.

(10) Patent No.: US 11,786,811 B2
(45) Date of Patent: Oct. 17, 2023

(54) VISUAL AND TACTILE AR MEDIUM BASED ON AUGMENTED REALITY

(71) Applicant: KOREA UNIVERSITY OF TECHNOLOGY AND EDUCATION INDUSTRY—UNIVERSITY COOPERATION FOUNDATION, Cheonan-si (KR)

(72) Inventors: Sang Youn Kim, Seoul (KR); Yong Hae Heo, Cheonan-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 17/528,418

(22) Filed: Nov. 17, 2021

(65) Prior Publication Data

US 2022/0339534 A1   Oct. 27, 2022

(30) Foreign Application Priority Data

Apr. 22, 2021 (KR) .......................... 10-2021-0052274

(51) Int. Cl.
| | |
|---|---|
| A63F 13/285 | (2014.01) |
| A63F 13/24 | (2014.01) |
| A63F 13/65 | (2014.01) |

(52) U.S. Cl.
CPC ............ *A63F 13/285* (2014.09); *A63F 13/24* (2014.09); *A63F 13/65* (2014.09); *A63F 2300/1037* (2013.01); *A63F 2300/8082* (2013.01)

(58) Field of Classification Search
CPC ........ A63F 13/285; A63F 13/24; A63F 13/65; A63F 2300/1037; A63F 2300/8082
See application file for complete search history.

(56) References Cited

U.S. PATENT DOCUMENTS

| | | | | | |
|---|---|---|---|---|---|
| 6,131,097 | A | * | 10/2000 | Peurach ................. | G06F 3/016 |
| | | | | | 707/999.102 |
| 2016/0303420 | A1 | * | 10/2016 | Silagy .............. | A63B 21/00072 |

(Continued)

FOREIGN PATENT DOCUMENTS

| | | |
|---|---|---|
| DE | 10 2019 105 854 B3 | 9/2020 |
| JP | 2012-238270 A | 12/2012 |

(Continued)

OTHER PUBLICATIONS

Extended European Search Report dated Apr. 19, 2022 for related European Patent Application No. 21209265.4.

(Continued)

*Primary Examiner* — Seng H Lim
(74) *Attorney, Agent, or Firm* — Sughrue Mion, PLLC

(57) ABSTRACT

Proposed is a visual and tactile AR medium based on augmented reality for providing a user with visual and tactile information matched with the augmented reality when the user experiences the augmented reality through the AR medium capable of being connected to a part of a body of the user, the AR medium including: a tactile augmentation member configured to enable the part of the body of the user to feel the augmented reality in a tactile manner; a visual augmentation member configured to overlay a graphic on the AR medium, and being capable of performing visual change; and a control member configured to perform transmission and reception with the AR medium, wherein the control member is configured to control output of the tactile augmentation member or the visual augmentation member, corresponding to input from the user or the AR medium or both.

16 Claims, 8 Drawing Sheets

(56) References Cited

U.S. PATENT DOCUMENTS

| | | | |
|---|---|---|---|
| 2018/0169500 A1* | 6/2018 | Kim | A63B 59/00 |
| 2018/0369691 A1* | 12/2018 | Rihn | G06F 3/016 |
| 2019/0155404 A1* | 5/2019 | Cutrell | A61H 3/068 |
| 2019/0212825 A1 | 7/2019 | Simmons | |
| 2019/0354183 A1* | 11/2019 | Swindells | G06F 3/016 |
| 2020/0042111 A1* | 2/2020 | Connellan | G06F 3/04883 |
| 2022/0270509 A1* | 8/2022 | Josephson | G06F 3/0346 |

FOREIGN PATENT DOCUMENTS

| | | | |
|---|---|---|---|
| KR | 10-2016-0123017 A | 10/2016 | |
| KR | 10-2016-0146114 A | 12/2016 | |
| KR | 10-2017-0119492 A | 10/2017 | |
| KR | 10-2019-0122546 A | 10/2019 | |
| KR | 10-2019-0131436 A | 11/2019 | |
| KR | 10-2020-0003841 A | 1/2020 | |
| KR | 10-2020-0129484 A | 11/2020 | |
| WO | 2016/170717 A1 | 10/2016 | |

OTHER PUBLICATIONS

Kim, ""Make virtual reality (VR) more vivid", Development of polymorphic tactile controller by domestic researchers", laver copper red reporter, The bridge economy internet article, Feb. 10, 2021 (7 pages total).

Request for the submission of an Opinion dated Oct. 20, 2022 from the Korean Intellectual Property Administration in KR Application No. 10-2021-0052274.

Office Action dated Jan. 24, 2023 in Japanese Application No. 2021-191246.

Office Action dated Apr. 21, 2023 in Korean Application No. 10-2021-0052274.

Office Action dated Aug. 1, 2023 in Japanese Application No. 2021-191246.

* cited by examiner

VISUAL AND TACTILE AR MEDIUM BASED ON AUGMENTED REALITY

CROSS REFERENCE TO RELATED APPLICATION

The present application claims priority to Korean Patent Application No. 10-2021-0052274, filed Apr. 22, 2021, the entire contents of which is incorporated herein for all purposes by this reference.

BACKGROUND OF THE INVENTION

Field of the Invention

The present disclosure relates to a visual and tactile AR medium based on augmented reality, wherein when a user experiences augmented reality with the visual and tactile AR medium connected to a part of the user's body, a visual augmented environment is provided to the user via the visual and tactile AR medium and simultaneously, a tactile sensation matched with the visual augmented environment is produced and provided to the user, so that the user can feel various sensations when using the visual and tactile AR medium.

Description of the Related Art

Unlike virtual reality (VR), augmented reality (AR) shows the real world to which virtual information is added. Virtual reality and augmented reality have something in common because both relate to a technology for creating an environment that does not actually exist, to enable the user to perceive the environment. However, from the user's point of view, there is a difference in that AR is a method in which virtual information is added to the actual reality and VR provides the user with all fictional situations.

In particular, such a difference is the difference between VR-based user experience with a controller such as a stick and AR-based user experience with a controller. In AR, some virtual objects based on augmented reality are added to the real appearance of the controller being actually used by the user, and the user views this. Therefore, there is an increasing need to enable the user to actually feel various real changes (the length, the tactile sensation, the center of gravity, etc.) of the controller in AR.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent Application Publication No. 10-2019-0131436 (publication date: 26 Nov. 2019); and
(Patent Document 2) Korean Patent Application Publication No. 10-2020-0003841 (publication date: 10 Jan. 2020).

SUMMARY OF THE INVENTION

The present disclosure is directed to providing a visual and tactile AR medium, wherein when a user experiences augmented reality with the AR medium connected to a part of the user's body, a visual augmented environment is provided to the user via the AR medium and simultaneously, a tactile sensation matched with the visual augmented environment is produced and provided to the user.

In addition, the present disclosure is directed to providing a visual and tactile AR medium, wherein when a user who wants to experience augmented reality looks at a controller (AR medium) that the user is wearing through AR glasses or an AR camera, the controller changes visually and a haptic sensation corresponding thereto is provided to the user.

In addition, the present disclosure is directed to providing a visual and tactile AR medium based on augmented reality, wherein the visual and tactile AR medium provides a visual augmented environment and simultaneously changes the size, shape, and resistance so that a user is provided with various sensations when using the visual and tactile AR medium.

Purposes of the present disclosure will not be limited to the above-described purposes, and other purposes that are not described herein will become apparent to a person with an ordinary skill in the art to which the present disclosure pertains from the following description.

According to the present disclosure, there is provided a visual and tactile AR medium based on augmented reality for providing a user with visual and tactile information matched with the augmented reality when the user experiences the augmented reality through the AR medium capable of being connected to a part of a body of the user, the AR medium including: a tactile augmentation member configured to enable the part of the body of the user to feel the augmented reality in a tactile manner; a visual augmentation member configured to overlay a graphic on the AR medium, and being capable of performing visual change; and a control member configured to perform transmission and reception with the AR medium, wherein the control member is configured to control output of the tactile augmentation member or the visual augmentation member, corresponding to input from the user or the AR medium or both.

The tactile augmentation member may include a vibration generation module that is configured to generate vibration in the visual and tactile AR medium, the vibration generation module including a vibrator or a vibration motor or both.

The tactile augmentation member may be configured to drive the vibrator to vibrate the tactile augmentation member so as to enable the user to have a tactile sensation of vibration.

When the vibration generation module includes the vibration motor, a plurality of the vibration motors may be used and the plurality of the vibration motors may be driven sequentially to generate a flow of vibration.

When the vibration generation module includes a plurality of the vibration motors, a flow of vibration may be generated by controlling a driving sequence and a strength of the plurality of the vibration motors.

When the vibration generation module includes a plurality of the vibration motors, a flow of vibration may be generated by controlling a driving sequence and a driving frequency of the plurality of the vibration motors.

When the vibration generation module includes the vibrator, the vibrator may be driven when the user works a virtual object through the AR medium, to provide an impulse generated due to the virtual object.

When the vibration generation module includes the vibrator, a warning or a notification may be capable of being given to the user.

The tactile augmentation member may be configured to change an actual length of the visual and tactile AR medium.

The visual and tactile AR medium may have a receiving space for a mass object to move therein, and the mass object may move along the receiving space to change a center of gravity.

The visual and tactile AR medium may be configured to change an actual length of the visual and tactile AR medium, and may have a receiving space for a mass object to move therein, and the mass object may move along the receiving space to change a center of gravity.

The tactile augmentation member may include a length extension member that is capable of extending an actual length of the visual and tactile AR medium, wherein the length extension member may include: a fixed module coupled to one end of the visual and tactile AR medium; and an extension module provided to be partially or entirely overlapped by the fixed module therein, the extension module moving protruding to another end of the visual and tactile AR medium.

The length extension member may further include a drive module that is connected to one end of the extension module and is capable of moving the extension module in a direction.

The tactile augmentation member may include a center-of-gravity movement member that is capable of changing a center of gravity of the visual and tactile AR medium, wherein the center-of-gravity movement member may include: a moving rail formed inside a housing, being parallel to a central axis of the housing that defines an appearance of the visual and tactile AR medium and has a receiving space in the housing; and a mass object configured to move along the moving rail.

The center-of-gravity movement member may further include a catching part that is configured for restraint to limit a distance of movement of the mass object when the mass object moves in a direction along an inside of the extension module.

The center-of-gravity movement member may further include a mass object drive module that is capable of moving the mass object in a direction.

The mass object drive module may use a single or a plurality of linear motors, or a plurality of electromagnets.

The tactile augmentation member may include a haptic drive member that enables the visual and tactile AR medium to produce a tactile sensation.

The haptic drive member may be realized in a form of a haptic wheel to provide the user with haptic feedback on movement of the wheel.

The tactile augmentation member may include an air resistance module that is configured to change a size of the visual and tactile AR medium to change air resistance.

The control member may include: a micro-controller unit (MCU) including a processor and a memory, and configured to control operation of the visual and tactile AR medium; a communication part configured to perform communication with an external AR device; a power supply configured to supply power to the AR medium; and a sensor capable of obtaining sensing information from the user.

According to the embodiments of the present disclosure, the visual and tactile AR medium based on augmented reality is provided with the visual augmentation member and provides a visual augmented environment, and simultaneously changes the size, shape, and resistance through the tactile augmentation member, which includes the drive member for changing the size or shape. Accordingly, the user can have realistic sensations related to augmented reality when using the visual and tactile AR medium.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
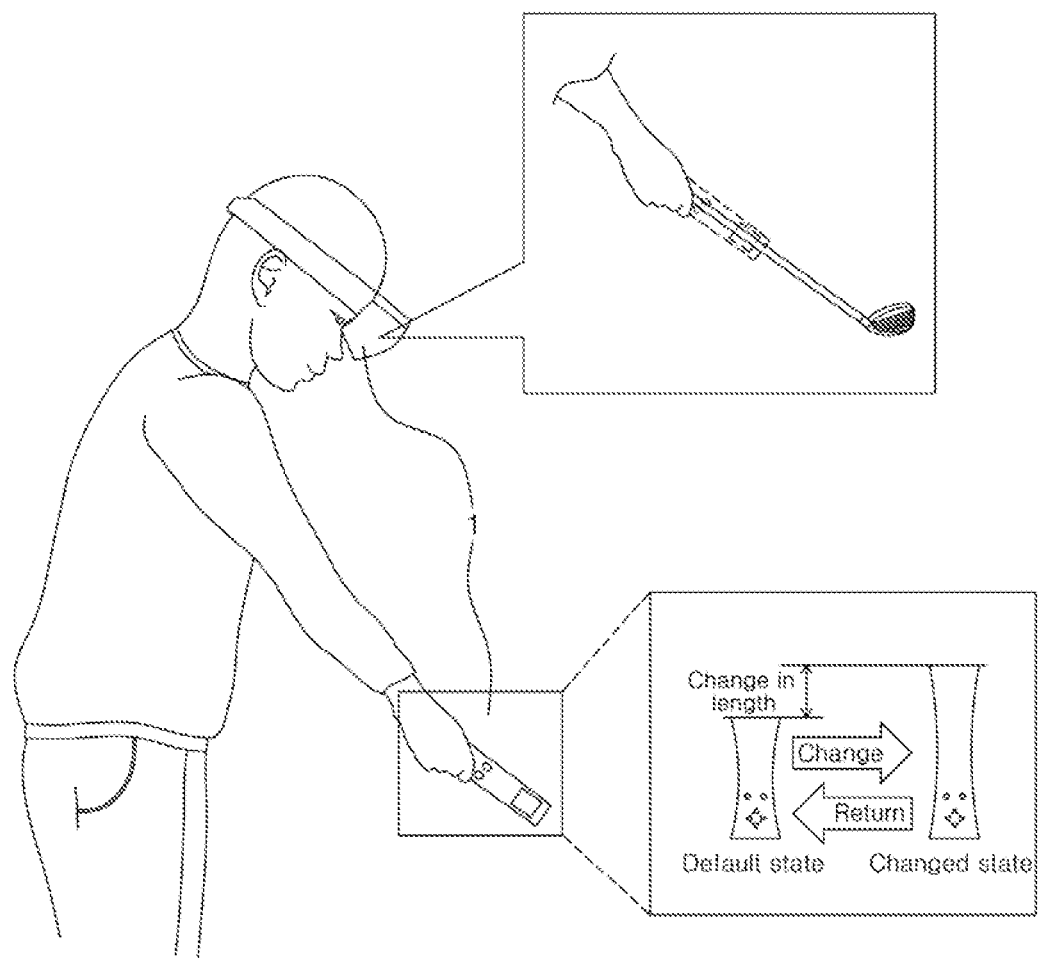
FIG. 1 is a diagram illustrating the use of a visual and tactile AR medium based on augmented reality according to an embodiment of the present disclosure.

Hereinafter, exemplary embodiments of the present disclosure will be described in detail with reference to the accompanying drawings. The embodiments introduced below are provided as examples so that the spirit of the present disclosure can be sufficiently conveyed to those skilled in the art. Therefore, the present disclosure is not limited to the embodiments described below and may be embodied in other forms. In the drawings, lengths, thicknesses, etc. of layers and regions may be exaggerated for convenience. Throughout the specification, the same reference numerals refer to the same elements.

Figure 2:
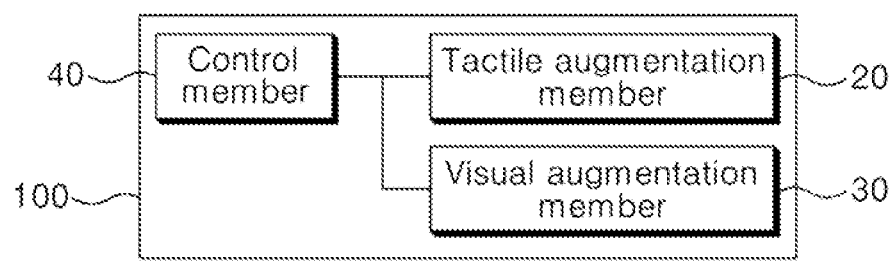
FIG. 2 is a block diagram illustrating a visual and tactile AR medium based on augmented reality according to an embodiment of the present disclosure.
Figure 3:
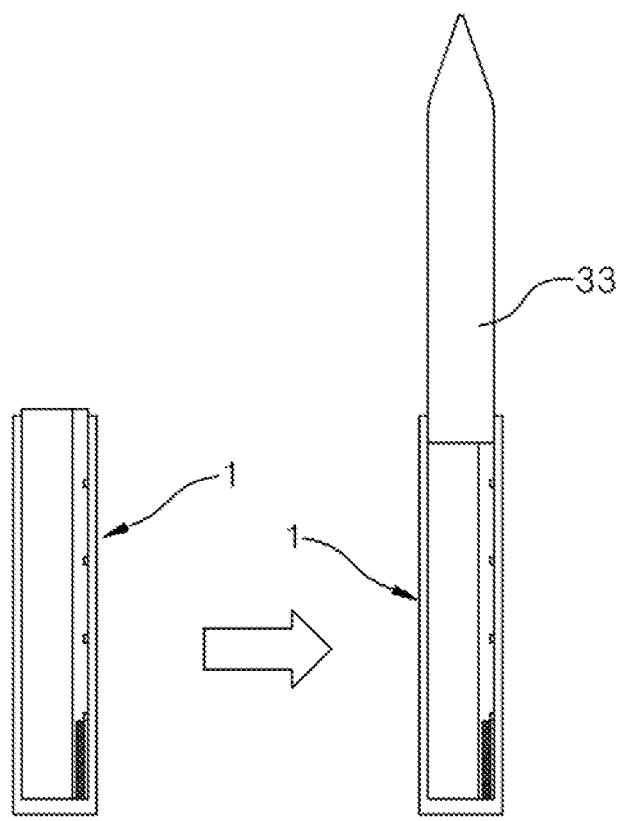
FIG. 3 is a diagram illustrating visual augmentation of a visual and tactile AR medium based on augmented reality according to an embodiment of the present disclosure.
Figure 4:
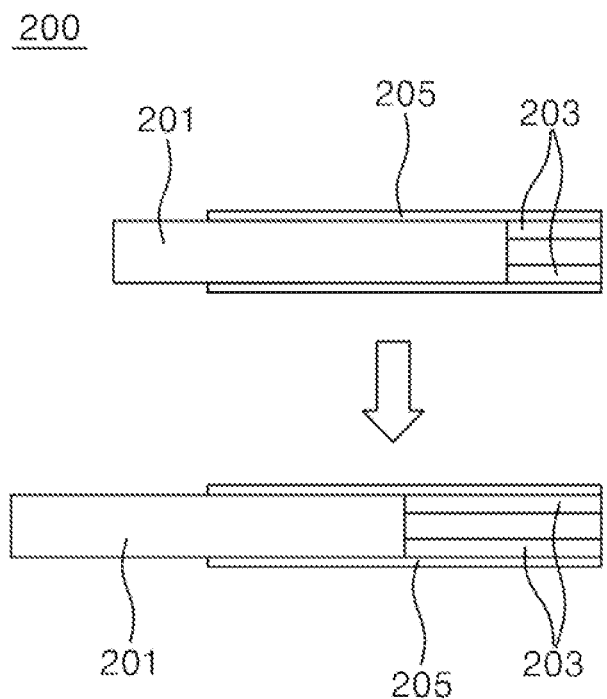
FIG. 4 is a diagram illustrating a length extension member of a visual and tactile AR medium based on augmented reality according to an embodiment of the present disclosure.
Figure 5A:
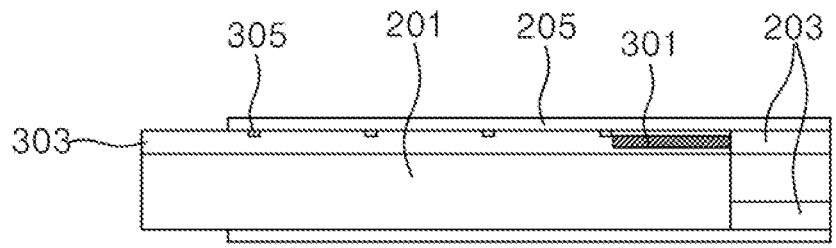
FIGS. 5A and 5B are diagrams illustrating a center-of-gravity movement member of a visual and tactile AR medium based on augmented reality according to an embodiment of the present disclosure.
Figure 5B:
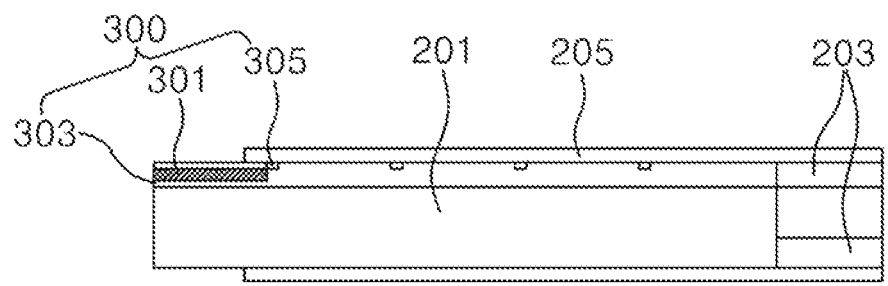
Figure 6:
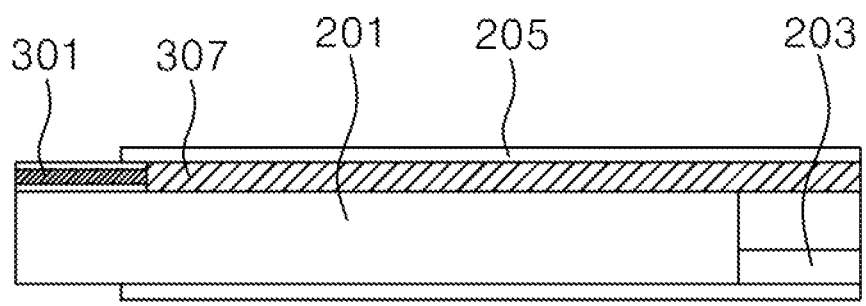
FIG. 6 is a diagram illustrating a center-of-gravity movement member of a visual and tactile AR medium based on augmented reality according to another embodiment of the present disclosure.
Figure 7:
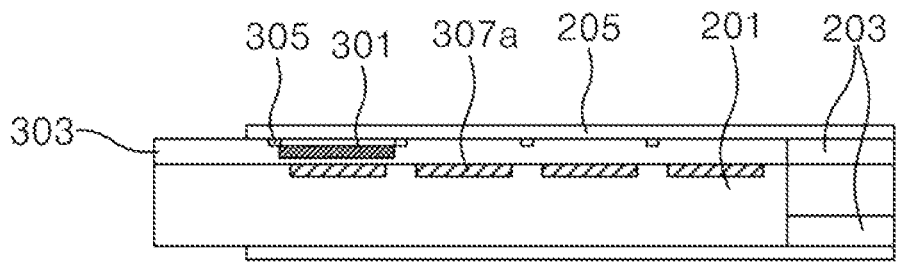
FIG. 7 is a diagram illustrating a center-of-gravity movement member of a visual and tactile AR medium based on augmented reality according to still another embodiment of the present disclosure.
Figure 8A:
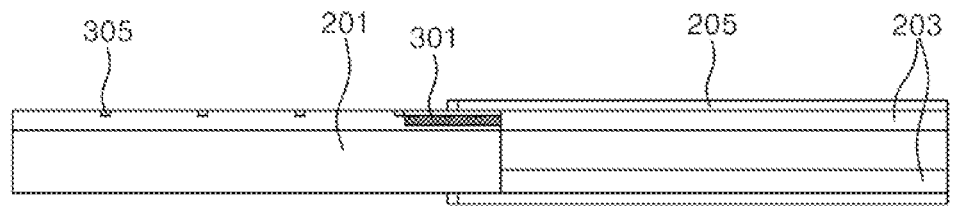
FIGS. 8A and 8B are diagrams illustrating a length extension member and a center-of-gravity movement member of a visual and tactile AR medium based on augmented reality according to an embodiment of the present disclosure.
Figure 8B:
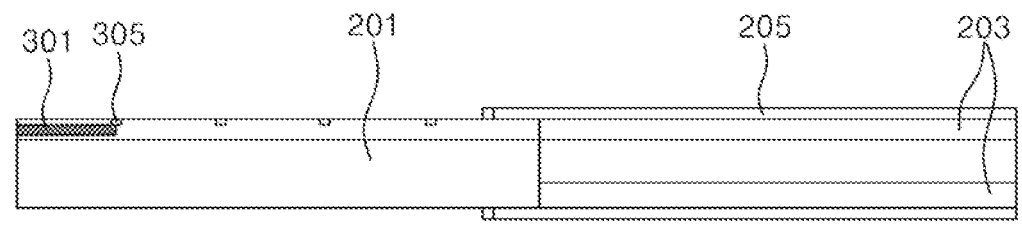
Figure 9:
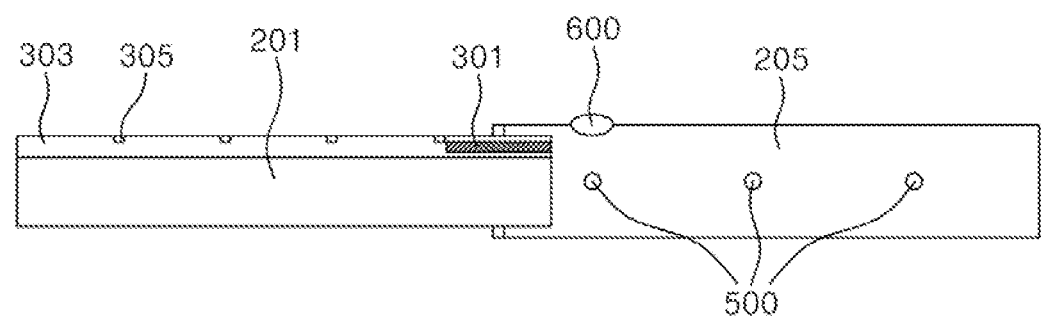
FIG. 9 is a diagram illustrating a haptic drive member and a vibration generation module of a visual and tactile AR medium based on augmented reality according to an embodiment of the present disclosure.
Figure 10A:
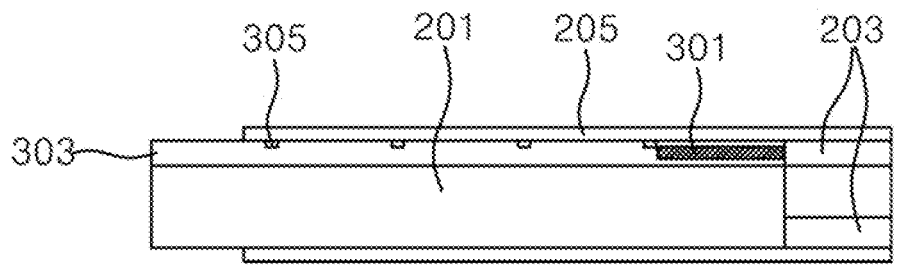
FIGS. 10A to 10C are diagrams illustrating the occurrence of both visual and tactile changes of a visual and tactile AR medium based on augmented reality according to an embodiment of the present disclosure.
Figure 10B:
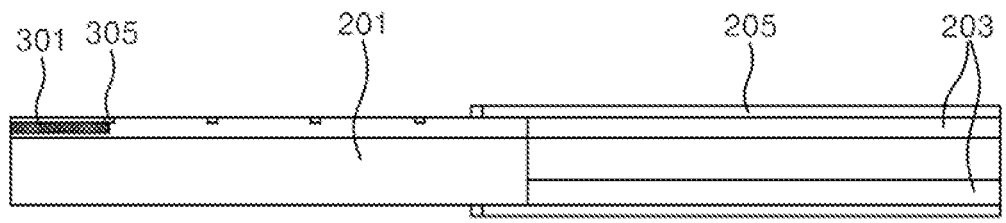
Figure 10C:
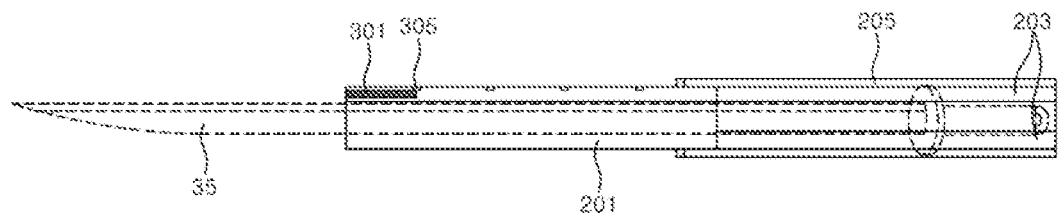
Figure 11:
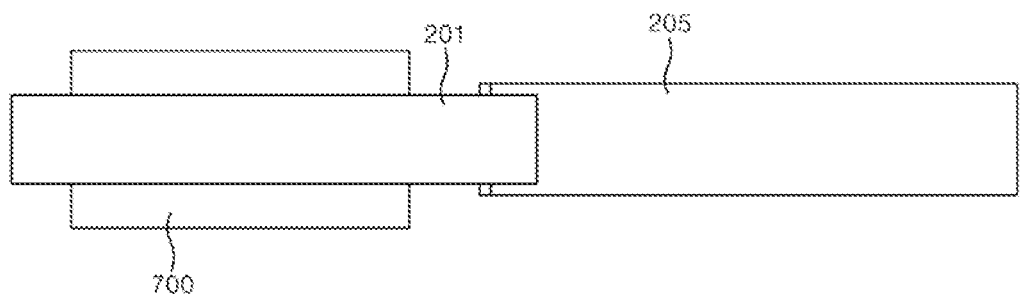
FIG. 11 is a diagram illustrating an air resistance module of a visual and tactile AR medium based on augmented reality according to an embodiment of the present disclosure.
Figure 12A:
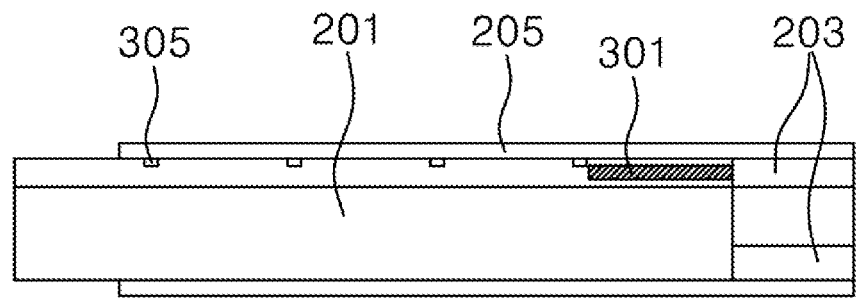
FIGS. 12A to 12C are diagrams illustrating the occurrence of both visual and tactile changes of a visual and tactile AR medium based on augmented reality according to another embodiment of the present disclosure.
Figure 12B:
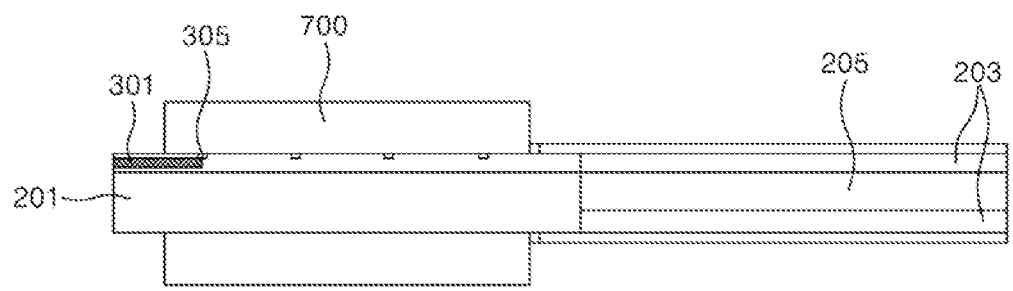
Figure 12C:
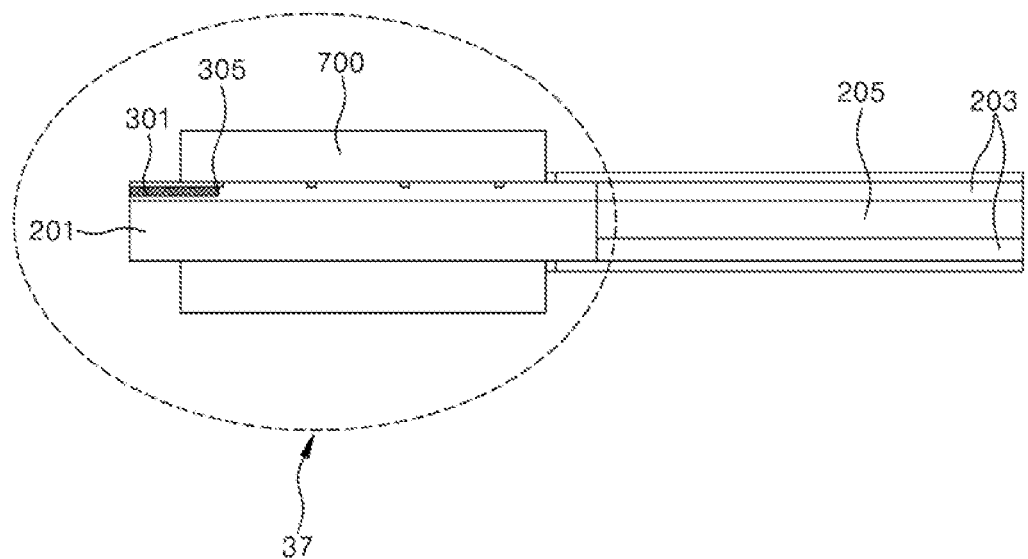
Figure 13:
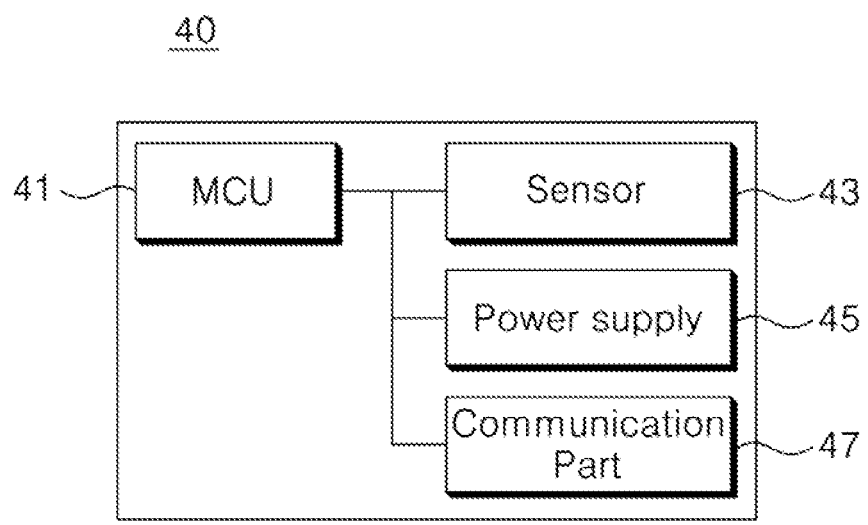
FIG. 13 is a block diagram illustrating a control member of a visual and tactile AR medium based on augmented reality according to an embodiment of the present disclosure.

FIG. 1 is a diagram illustrating the use of a visual and tactile AR medium based on augmented reality according to an embodiment of the present disclosure. FIG. 2 is a block diagram illustrating a visual and tactile AR medium based on augmented reality according to an embodiment of the present disclosure. FIG. 3 is a diagram illustrating visual augmentation of a visual and tactile AR medium based on augmented reality according to an embodiment of the present disclosure. FIG. 4 is a diagram illustrating a length extension member of a visual and tactile AR medium based on augmented reality according to an embodiment of the present disclosure. FIGS. 5A and 5B are diagrams illustrating a center-of-gravity movement member of a visual and tactile AR medium based on augmented reality according to an embodiment of the present disclosure. FIG. 6 is a diagram illustrating a center-of-gravity movement member of a visual and tactile AR medium based on augmented reality according to another embodiment of the present disclosure. FIG. 7 is a diagram illustrating a center-of-gravity movement member of a visual and tactile AR medium based on augmented reality according to still another embodiment of the present disclosure. FIGS. 8A and 8B are diagrams illustrating a length extension member and a center-of-gravity movement member of a visual and tactile AR medium based on augmented reality according to an embodiment of the present disclosure. FIG. 9 is a diagram illustrating a haptic drive member and a vibration generation module of a visual and tactile AR medium based on augmented reality according to an embodiment of the present disclosure. FIGS. 10A to 10C are diagrams illustrating the occurrence of both visual and tactile changes of a visual and tactile AR medium based on augmented reality according to an embodiment of the present disclosure. FIG. 11 is a diagram illustrating an air resistance module of a visual and tactile AR medium based on augmented reality according to an embodiment of the present disclosure. FIGS. 12A to 12C are diagrams illustrating the occurrence of both visual and tactile changes of a visual and tactile AR medium based on augmented reality according to another embodiment of the present disclosure. FIG. 13 is a block diagram illustrating a control member of a visual and tactile AR medium based on augmented reality according to an embodiment of the present disclosure.

In the present disclosure, an AR device used herein is the device that enables the user to experience AR content. For example, as shown in FIG. 1, examples of the AR device may include AR glasses that the user is wearing, and various mobile devices (a mobile phone or pad having an AR camera) providing an augmented reality camera function. However, no limitation thereto is imposed.

In addition, in the present disclosure, an AR medium used herein refers to various devices that a user can wear and experience augmented reality. The AR medium means a device that is connected to a part of the user's body to provide the user a variety of sensuous feedback.

As an embodiment, the AR medium may be a stick-shaped controller that the user can hold by hand, as shown in FIG. 1 or 3. As another embodiment, the AR medium may be a controller in the form that the user can put on the user's arm, or may be a controller in the form of boots that the user can put on the user's feet. However, the AR medium is not limited to the above-described forms, and may include various embodiments of the form that can provide tactile feedback directly to the user, is worn on the user, and touches the user.

In addition, like the mobile phone or pad described above, the device that includes a camera, a visual device, and a vibration motor and the user can hold by hand may be the AR medium and the AR device simultaneously.

According to an embodiment of the present disclosure, a visual and tactile AR medium 1 based on augmented reality is a visual and tactile AR medium for providing a user with visual and tactile information matched with the augmented reality when the user experiences the augmented reality through the AR medium capable of being connected to a part of a body of the user, the AR medium including: a tactile augmentation member 20 configured to enable the part of the body of the user to feel the augmented reality in a tactile manner; a visual augmentation member 30 configured to overlay a graphic on the AR medium, and being capable of performing visual change; and a control member 40 configured to perform transmission and reception with the AR medium, wherein the control member 40 is configured to control output of the tactile augmentation member or the visual augmentation member, corresponding to input from the user or the AR medium or both.

The overlaying of the graphic means that additional augmented reality content is visually put over the AR medium, so that when the user looks at the AR medium through the AR device, such as AR glasses, the added augmented reality content is visually viewed (33, 35, 37).

As an example, FIG. 3 shows the case in which the visual augmentation member 30 is applied to the visual and tactile AR medium 1. With the visual augmentation member 30 applied, additional augmented reality content is visually put over the AR medium 1, so when the user looks at the AR medium 1 through the AR device, such as AR glasses, the added augmented reality content 33 is visually viewed. That is, the visual augmentation member 30 performs a function for the user to view virtual information (a virtual object based on augmented reality) added to the visual and tactile AR medium 1 when the user looks at the visual and tactile AR medium 1 through various AR devices (for example, AR glasses). The visual augmentation member 30 may be embodied in various ways, and is not limited to an embodiment to be described later.

As an embodiment, the visual augmentation member 30 may be realized in the form of a marker. Specifically, a marker is provided at one end of a housing 100, so when the user looks at the marker of the housing 100) through the AR device (AR glasses or a mobile device providing an augmented reality camera function), the user is able to view various visual augmentation objects through the marker. For example, when the visual and tactile AR medium 1 based on augmented reality provides augmented reality related to sports game, visual augmented reality is provided to the user through the AR device, such as AR glasses, by the visual augmentation member in various shapes such as a golf club shape shown in FIG. 1, a baseball bat shape, or a table tennis racket shape 37 shown in FIGS. 12A to 12C. As another example, when applied to a fighting game, the visual augmentation member 30 provides a visual shape such as a sword shape 35 shown in FIGS. 10A to 10C.

The visual and tactile AR medium 1 may include the tactile augmentation member 20, the visual augmentation member 30, and the control member 40, and may include the housing 100 that defines the appearance of the visual and tactile AR medium 1. The housing 100 defines the appearance of the visual and tactile AR medium 1, and may have a receiving space in the housing 100.

The tactile augmentation member 20 may be for changing the actual length of the visual and tactile AR medium.

As an example, the tactile augmentation member 20 may include a length extension member 200 that is capable of extending the actual length of the visual and tactile AR medium 1. The length extension member 200 may include an extension module 201 and a fixed module 205. The fixed module 205 is coupled to one end of the visual and tactile AR medium. The extension module 201 is provided to be partially or entirely overlapped by the fixed module 205 therein, and moves protruding to another end of the visual and tactile AR medium. That is, the length extension member 200 may perform a function of extending the visual and tactile AR medium 1 in a particular direction (for example, a length direction that is an outward direction from the user's body when the user is wearing the visual and tactile AR medium).

In addition, the length extension member 200 may further include a drive module 203 that is connected to one end of the extension module 201 and is capable of moving the extension module 201 in a direction. Regarding the drive module 203, as an embodiment, the drive module 203 may be a linear motor and may perform a function of moving the extension module 201 in a length direction or returning the moved extension module 201. In addition, single or multiple linear motors may be provided. The linear motor may be placed only at one side of the housing 100, or the multiple linear motors may be placed at one side or opposite sides of the housing. In addition, the drive module 203 is not necessarily required. Without any energy source, the user may manually pull the extension module 201 from the fixed module 205 to extend the length or may return the extended length back.

As shown in FIGS. 5A to 7, the visual and tactile AR medium 1 may have a receiving space for a mass object 301 to move therein, and along the receiving space, the mass object 301 moves to change the center of gravity.

In addition, the tactile augmentation member 20 includes a center-of-gravity movement member 300 that is capable of changing the center of gravity of the visual and tactile AR medium 1. The center-of-gravity movement member 300 may include the mass object 301 and a moving rail 303. The moving rail 303 is formed inside the housing, being parallel to the central axis of the housing that defines the appearance of the visual and tactile AR medium 1 and has the receiving space in the housing. The mass object 301 moves along the moving rail 303. More specifically, the mass object 301 may be a weight.

In this case, the center-of-gravity movement member 300 may further include a catching part 305 that is for restraint to limit the distance of the movement of the mass object 301 when the mass object 301 moves in a direction along the inside of the extension module 201. For example, when the user applies pressure in the direction of the inside of the housing 100, the catching part 305 removes the restraint of the mass object 301 so that the mass object 301 moves. Further, to enable the user to actually feel a complex center-of-gravity movement, multiple mass objects 301 and multiple moving rails 303 may be formed at different locations (for example, formed at the upper side and the lower side, respectively, being parallel to the central axis) with respect to the central axis of the housing 100.

The center-of-gravity movement member 300 may further include a mass object drive module 307 that is capable of moving the mass object in a direction. That is, the movement of the mass object 301 may be manual movement by the user through the catching part 305 or may be achieved using an additional mass object drive module (307 or 307a) as shown in FIG. 6 or 7.

For example, the mass object drive module 307 may use a single or multiple linear motors 307 or multiple electromagnets 307a.

As shown in FIG. 6, when a linear motor is used, the movement of the mass object 301 is controlled by the control member 40, which will be described later, so that the mass object 301 is dynamically moved in real time during experience of augmented reality. In addition, the mass object drive module 307 may be realized as a separate drive module, or may operate using the drive module 203 of the length extension member 200.

As shown in FIG. 7, when the mass object 301 is a magnetic material, the mass object drive module 307a is not a mechanical element, such as a linear motor, which pushes or pulls the mass object 301 physically, but may be realized as multiple electromagnets formed at the moving rail 303 on which the mass object 301 moves. That is, through the control member 40, which will be described later, the current is selectively supplied to the multiple electromagnets formed at the moving rail 303 and the mass object 301 is made to stick to a particular electromagnet through magnetism, whereby the location of the mass object 301 is moved or fixed.

FIGS. 8A and 8B shows an embodiment of various applications of the length extension member 200 and the center-of-gravity movement member 300 among the various tactile augmentation methods of the present disclosure. In an initialization mode of the visual and tactile AR medium 1, the extension module 201 is moved in the direction in which the length of the visual and tactile AR medium 1 is extended, so that the actual length of the visual and tactile AR medium 1 is extended through the movement of the extension module 201. Next, the mass object 301 is moved in the direction in which the length of the visual and tactile AR medium 1 is extended. Consequently, because of the movement of the mass object 301 and the extension of the length of the visual and tactile AR medium 1, the user can actually feel the change in the length of the visual and tactile AR medium 1 and the movement of the center of gravity simultaneously.

FIGS. 10A to 10C show an embodiment of the occurrence of both visual and tactile changes in the visual and tactile AR medium 1 among the various tactile augmentation methods of the present disclosure. As shown in FIGS. 10A to 10C, when the user looks at the visual and tactile AR medium 1 through the AR device such as AR glasses, a sword shape is virtually created at the visual and tactile AR medium 1 through the visual augmentation member 30. The actual length of the visual and tactile AR medium 1 is increased by moving the extension module 201 of the length extension member 200. The mass object 301 of the center-of-gravity movement member 300 is moved to one end of the extension module 201 in a direction away from the user. Consequently, the length of the visual and tactile AR medium 1 is extended, the center of gravity moves in a direction away from the user, and a virtual sword 35 is visually viewed, so that the user can actually feel as if the user were brandishing a real long sword.

That is, when the tactile augmentation member 20 uses both the length extension member 200 and the center-of-gravity movement member 300, the mass object drive module 307 moves the location of the mass object 301 and the extension module 201 actually extends the actual length of the visual and tactile AR medium 1. For the user, both the center of gravity and the length of the visual and tactile AR medium 1 are changed, and in rotation, rotational inertia different from the previous one occurs. When this is applied, for example, the user can simultaneously feel a sensation of length and a sensation of weight for the sword 35 displayed in augmented reality and distinguish between the sensations.

As shown in FIG. 9, the tactile augmentation member 20 may further include a vibration generation module 500 for generating vibration in the visual and tactile AR medium. The vibration generation module 500 may include a vibrator or a vibration motor or both. As an example, a single or multiple vibration generation modules 500 may be provided at the fixed module 205 to provide the user with vibration that is appropriate to the augmented reality that the user is experiencing.

The tactile augmentation member 20 drives the vibrator to vibrate the tactile augmentation member 20 to enable the user to have a tactile sensation of vibration.

In the case in which the vibration generation module 500 includes the vibrator, the vibrator is driven when the user works a virtual object through the AR medium 1, to provide an impulse generated due to the virtual object.

When the vibration generation module includes the vibrator, a warning or a notification is capable of being given to the user.

In addition, when the vibration generation module 500 includes the vibration motor, a plurality of the vibration motors are used and the vibration motors are driven sequentially to generate the flow of vibration.

When the vibration generation module 500 includes a plurality of vibration motors, the flow of vibration is generated by controlling the driving sequence and the strength of the vibration motors.

When the vibration generation module 500 includes a plurality of vibration motors, the flow of vibration is generated by controlling the driving sequence and the driving frequency of the vibration motors. Specifically, a plurality of vibration generation modules 500 are provided inside the fixed module 205, so when a target object is hit or a collision with the target object occurs, vibration occurs to realize a variety of tactile augmented reality. More specifically, assuming that the user is hitting a virtual object in augmented reality, vibration is generated by the vibration generation module 500 first that is close to the virtual object among the vibration generation modules 500, so that the user can actually feel a sensation of hitting. Further, by generating vibration with time difference between the vibration generation modules 500 or by applying and adjusting a pulse driving, shifting vibration may be provided to enable the user to actually also feel the movement direction of vibration.

Consequently, with the above-described shifting vibration (the flow of vibration), when the user brandishes a sword displayed with the visual and tactile AR medium 1 in augmented reality to hit a virtual object, the vibration caused by the hitting of the object is realized in such a manner that vibration starts from the vibration generation module 500 close to the extension module 201 of the visual and tactile AR medium 1 and vibration is gradually shifted to the vibration generation module 500 close to the user's hand.

The tactile augmentation member 20 may further include a haptic drive member 600 for enabling the visual and tactile AR medium 1 to produce a tactile sensation. The haptic drive member may be realized in the form of a haptic wheel to provide the user with haptic feedback on the movement of the wheel. In addition, the term haptic used in the present disclosure means the sense of touch as well as enabling the user to feel a tactile sensation, force, a sensation of movement, inertia, etc.

As an embodiment, the visual and tactile AR medium 1 based on augmented reality may include the haptic drive member 600 in the form of a mouse wheel at one end of the housing 100 to produce a tactile sensation of sensing a limited region in augmented reality. Specifically, the haptic drive member 600 is realized in the form of a haptic wheel. The user performs various adjustment functions (for example, a wheel-turning action) through the haptic wheel with respect to the augmented reality content overlaid on the visual augmentation member 30. When the upper threshold value or the lower threshold value of the adjustment function is reached and the adjustment function is unable to be performed any longer (for example, when the haptic wheel is turned all the way to the left or right), the haptic wheel gives the haptic feedback having the meaning that it is difficult to perform the adjustment function any longer.

The tactile augmentation member 20 may further include an air resistance module 700 for changing the size of the visual and tactile AR medium 1 to change air resistance.

FIG. 11 shows an embodiment in which among various tactile augmentation methods of the present disclosure, in addition to the length extension and the movement of the center of gravity, air resistance is changed by changing the size of the visual and tactile AR medium 1 additionally using the air resistance module 700. As shown in the figure, a single or multiple air resistance modules 700 may be provided at the extension module 201 in the housing 100 to provide the user with a sensation of air resistance that is appropriate to the augmented reality that the user is experiencing. Specifically, the air resistance module 700 may be realized in the form that passes along the outer circumferential surface of the extension module 201 after the extension module 201 moves in a protruding manner, and is capable of unfolding to the outside. More specifically, the air resistance module 700 may be provided in the form that is unfolded and spread when the user pulls the module, but is not limited thereto.

Consequently, different air resistances that the user feels when brandishing the visual and tactile AR medium 1 are provided depending on the degree of unfolding, such as the unfolded length or the unfolded width of the air resistance module 700. For example, when a sword is used, different air resistances may be designed depending on the situation provided in augmented reality, like the case in which a table tennis racket or a baseball bat is brandished. The air resistance module 700 is adjusted to provide a variety of air resistances so that user actually feels different air resistances.

FIGS. 12A to 12C show an embodiment of the occurrence of both visual and tactile changes (the length, the center of gravity, the air resistance, etc.) in the visual and tactile AR medium 1 among the various tactile augmentation methods of the present disclosure. As shown in FIGS. 12A to 12C, assuming that the user is experiencing table tennis with the visual and tactile AR medium 1 through the AR device such as AR glasses, the table tennis racket shape 37 is virtually created at the visual and tactile AR medium 1 through the visual augmentation member 30. The actual length of the visual and tactile AR medium 1 is increased by the real length of a table tennis racket by moving the extension module 201 of the length extension member 200. The mass object 301 of the center-of-gravity movement member 300 is moved to one end of the extension module 201 to the degree corresponding to a table tennis racket. Next, the air resistance module 700 is unfolded. Consequently, the length of the visual and tactile AR medium 1 is increased, the center of gravity moves in a direction away from the user, and when the air resistance module 700 is swung while unfolded, a sensation of wind resistance is increased. Visually, a virtual table tennis racket is viewed. Therefore, the user can actually feel as if the user were playing table tennis with a real table tennis racket. In addition, although not shown in the drawings, a sensation of vibration of the case in which the user is hitting a table tennis ball with a table tennis racket may be realized using the vibration generation module 500.

The various elements of the visual augmentation member 30 and the tactile augmentation members (the length extension member 200, the center-of-gravity movement member 300, the vibration generation module 500, the haptic drive member 600, and the air resistance module 700) of the visual and tactile AR medium 1 may be used together or may be configured in combination as needed, and no limitation to the above-described embodiments are imposed.

The control member 40 controls the output of the tactile augmentation member 20 or the visual augmentation member 30, corresponding to the input from the user or the AR medium or both. The control member 40 may further include: a micro-controller unit (MCU) 41 for controlling the operation of the visual and tactile AR medium, the micro-controller unit including a processor and a memory; a sensor 43 capable of obtaining sensing information (pressure, acceleration, and the geomagnetic field) from the user; a power supply 45 for supplying power to the AR medium; and a communication part 47 for communication with external AR devices.

The control member 40 provides a function of controlling the operation of various elements of the visual and tactile AR medium 1 or controlling transmission/reception of data through communication with the outside. More specifically, the control member 40 that performs transmission to and reception from an external device, such as the AR device, may control the output of the tactile augmentation member 20 or of the visual augmentation member 30 or both as described above.

More specifically, various pieces of sensing information are obtained through the sensor (for example, the degree to which the user actually applies pressure to the visual and tactile AR medium 1 may be obtained through a pressure sensor), and the various pieces of sensing information are transmitted to various external devices including an external AR device through the control member. Feedback on the transmitted sensing information influences the visual and tactile AR medium 1 (for example, when the user applies high pressure, the high pressure influences the tactile augmentation member 20 to make the visual and tactile AR medium 1 change in size). Accordingly, more realistic interaction between the user and the visual and tactile AR medium 1 can be achieved.

In addition, the visual and tactile AR medium 1 based on augmented reality is connected through the control member 40 to external devices including AR devices that are in communication with a game system, thus allowing the user to interact with a virtual environment and objects in the environment. That is, in a virtual augmented reality or mixed reality system, the user works objects through the control member 40 to perform input, and corresponding to input signals, the control member performs output to drive the tactile augmentation member 20 and the visual augmentation member 30, so that the user is provided with visual and tactile sensations for the input.

In addition, the communication part 47 supports wired or wireless communication or both between the visual and tactile AR medium 1 and various external devices including AR devices. A wireless communication method is not particularly limited, and may be selected from various communication methods, such as Bluetooth, Zigbee, Wi-Fi, infrared data communication (IrDA), ultra-wide band (UWB), etc.

The power supply 45 supplies power to the above-described various elements, such as the tactile augmentation member 20, the sensor 43, the communication part 47, and the haptic drive member 600, under the control of the MCU. The power supply 45 may be composed of an on/off switching circuit and a battery, or may be realized in the form of including an AC-DC conversion circuit.

Consequently, according to an embodiment of the present disclosure, the visual and tactile AR medium 1 based on augmented reality is provided with the visual augmentation member and provides a visual augmented environment, and simultaneously generates the tactile sensation matched with the visual augmented environment to provide the tactile sensation to the user. The visual and tactile AR medium 1 includes: the visual augmentation member 30 for performing a function of making virtual information added to the visual and tactile AR medium 1 and viewed; and the tactile augmentation member 20 for changing the length, the center of gravity, the flow of vibration, and air resistance. Accordingly, the user is provided with more realistic and various sensations when using the visual and tactile AR medium 1 in an augmented reality environment.

Although the present disclosure has been described with reference to the exemplary embodiments, those skilled in the art will appreciate that various modifications and variations can be made in the present disclosure without departing from the spirit or scope of the disclosure described in the appended claims.

What is claimed is:

1. A visual and tactile AR medium for providing a user with visual and tactile information matched with augmented reality when the user experiences the augmented reality through the AR medium capable of being connected to a part of a body of the user, the AR medium comprising:
   a tactile augmentation member configured to enable the part of the body of the user to feel the augmented reality in a tactile manner;
   a visual augmentation member configured to overlay a graphic on the AR medium, and being capable of performing visual change; and
   a control member configured to perform transmission and reception with the AR medium,
   wherein the control member is configured to control output of the tactile augmentation member or the visual augmentation member, corresponding to input from the user or the AR medium or both,
   wherein the visual and tactile AR medium is configured to change an actual length of the visual and tactile AR medium, and has a length extension member that is capable of extending the actual length of the visual and tactile AR medium,
   wherein the length extension member comprises:
      a fixed module coupled to one end of the visual and tactile AR medium; and
      an extension module provided to be partially or entirely overlapped by the fixed module therein, the extension module moving protruding to another end of the visual and tactile AR medium, and wherein the extension module has a receiving space for a mass object to move therein and the mass object moves along the receiving space to change a center of gravity, wherein the mass object is configured to be moved along the receiving space of the extension module in a direction in which the actual length of the visual and tactile AR medium is extended after the actual length of the visual and tactile AR medium is extended by the extension module, and wherein the center-of-gravity movement member further comprises a plurality of catching parts configured for restraint to limit a distance of movement of the mass object when the mass object moves in a direction along an inside of the extension module.

2. The AR medium of claim 1, wherein the tactile augmentation member comprises a vibration generation module that is configured to generate vibration in the visual and tactile AR medium, the vibration generation module comprising a vibrator or a vibration motor or both.

3. The AR medium of claim 2, wherein the tactile augmentation member is configured to drive the vibrator to vibrate the tactile augmentation member so as to enable the user to have a tactile sensation of vibration.

4. The AR medium of claim 2, wherein when the vibration generation module comprises the vibration motor, a plurality of the vibration motors are used and the plurality of the vibration motors are driven sequentially to generate a flow of vibration.

5. The AR medium of claim 2, wherein when the vibration generation module comprises a plurality of the vibration motors, a flow of vibration is generated by controlling a driving sequence and a strength of the plurality of the vibration motors.

6. The AR medium of claim 2, wherein when the vibration generation module comprises a plurality of the vibration motors, a flow of vibration is generated by controlling a driving sequence and a driving frequency of the plurality of the vibration motors.

7. The AR medium of claim 2, wherein when the vibration generation module comprises the vibrator, the vibrator is driven when the user works a virtual object through the AR medium, to provide an impulse generated due to the virtual object.

8. The AR medium of claim 2, wherein when the vibration generation module comprises the vibrator, a warning or a notification is capable of being given to the user.

9. The AR medium of claim 1, wherein the length extension member further comprises a drive module that is connected to one end of the extension module and is capable of moving the extension module in a direction.

10. The AR medium of claim 1, wherein the tactile augmentation member comprises a center-of-gravity movement member that is capable of changing a center of gravity of the visual and tactile AR medium, wherein the center-of-gravity movement member comprises:
a moving rail formed inside a housing, being parallel to a central axis of the housing that defines an appearance of the visual and tactile AR medium.

11. The AR medium of claim 10, wherein the center-of-gravity movement member further comprises a mass object drive module that is capable of moving the mass object in a direction.

12. The AR medium of claim 11, wherein the mass object drive module uses a single or a plurality of linear motors, or a plurality of electromagnets.

13. The AR medium of claim 1, wherein the tactile augmentation member comprises a haptic drive member that enables the visual and tactile AR medium to produce a tactile sensation.

14. The AR medium of claim 13, wherein the haptic drive member is realized in a form of a haptic wheel to provide the user with haptic feedback on movement of the wheel.

15. The AR medium of claim 1, wherein the tactile augmentation member comprises an air resistance module that is configured to change a size of the visual and tactile AR medium to change air resistance, and wherein the air resistance module is provided at the extension module, and is capable of unfolding to an outside to change a length and width thereof.

16. The AR medium of claim 1, wherein the control member comprises:
a micro-controller unit (MCU) including a processor and a memory, and configured to control operation of the visual and tactile AR medium;
a communication part configured to perform communication with an external AR device;
a power supply configured to supply power to the AR medium; and
a sensor capable of obtaining sensing information from the user.

* * * * *